United States Patent
Moon et al.

(10) Patent No.: US 10,733,868 B2
(45) Date of Patent: *Aug. 4, 2020

(54) SENSOR DATA TO IDENTIFY CATASTROPHE AREAS

(71) Applicant: STATE FARM MUTUAL AUTOMOBILE INSURANCE COMPANY, Bloomington, IL (US)

(72) Inventors: Phillip Sangpil Moon, Bloomington, IL (US); Sunish Menon, Normal, IL (US); Jeffrey Kinsey, Bloomington, IL (US); Jeffrey Wilson Stoiber, Atlanta, GA (US)

(73) Assignee: STATE FARM MUTUAL AUTOMOBILE INSURANCE COMPANY, Bloomington, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/600,026

(22) Filed: Oct. 11, 2019

(65) Prior Publication Data

US 2020/0043316 A1 Feb. 6, 2020

Related U.S. Application Data

(63) Continuation of application No. 15/397,228, filed on Jan. 3, 2017, now Pat. No. 10,482,746.
(Continued)

(51) Int. Cl.
*G08B 21/10* (2006.01)
*G08B 27/00* (2006.01)
(Continued)

(52) U.S. Cl.
CPC ......... *G08B 21/10* (2013.01); *G01C 21/3415* (2013.01); *G01C 21/3461* (2013.01);
(Continued)

(58) Field of Classification Search
CPC ............................ G08B 21/10; G01C 21/3415
See application file for complete search history.

(56) References Cited

U.S. PATENT DOCUMENTS

| 8,816,881 B2 | 8/2014 | Nakata et al. |
| 9,244,167 B1 | 1/2016 | Oransky et al. |

(Continued)

*Primary Examiner* — Steven Lim
*Assistant Examiner* — Mancil Littlejohn, Jr.
(74) *Attorney, Agent, or Firm* — Faegre Drinker Biddle & Reath LLP

(57) ABSTRACT

A computer-implemented method for generating an automated response to a catastrophic event, that includes (1) analyzing a sample set of data generated in association with a catastrophic event to determine a threshold pattern; (2) receiving, with customer permission or affirmative consent, home sensor data from a smart home controller via wireless communication or data transmission, the home sensor data including data regarding at least one of (i) structural status; (ii) wind speed; (iii) availability of electricity; (iv) presence of water; (v) temperature; (vi) pressure; and/or (vii) presence of pollutants in the air and/or water; (3) determining, based upon or from computer analysis of the home sensor data, whether the home sensor data indicates a match to the threshold pattern; and (4) automatically generating a response if the home sensor data indicates a match to the threshold pattern. As a result, catastrophic events and responses thereto may be improved through usage of a remote network of home sensors.

20 Claims, 3 Drawing Sheets

Related U.S. Application Data

(60) Provisional application No. 62/307,101, filed on Mar. 11, 2016, provisional application No. 62/275,566, filed on Jan. 6, 2016.

(51) Int. Cl.
| | | |
|---|---|---|
| *G01C 21/34* | (2006.01) | |
| *G01S 19/42* | (2010.01) | |
| *G06Q 40/08* | (2012.01) | |
| *G08B 21/18* | (2006.01) | |
| *G08B 25/00* | (2006.01) | |
| *G08G 1/01* | (2006.01) | |
| *G06Q 50/26* | (2012.01) | |
| *H04Q 9/00* | (2006.01) | |

(52) U.S. Cl.
CPC .............. *G01S 19/42* (2013.01); *G06Q 40/08* (2013.01); *G06Q 50/265* (2013.01); *G08B 21/182* (2013.01); *G08B 25/006* (2013.01); *G08B 27/001* (2013.01); *G08G 1/0137* (2013.01); *H04Q 9/00* (2013.01)

(56) References Cited

U.S. PATENT DOCUMENTS

| | | |
|---|---|---|
| 9,721,304 B1 | 8/2017 | Parchment et al. |
| 10,057,664 B1 | 8/2018 | Moon et al. |
| 10,244,294 B1 | 3/2019 | Moon et al. |
| 2005/0134504 A1 | 6/2005 | Harwood et al. |
| 2006/0036366 A1 | 2/2006 | Kelly et al. |
| 2007/0044539 A1 | 3/2007 | Sabol et al. |
| 2009/0265193 A1 | 10/2009 | Collins et al. |
| 2012/0019353 A1 | 1/2012 | Knasel |
| 2012/0083960 A1 | 4/2012 | Zhu et al. |
| 2012/0123886 A1 | 5/2012 | Brown et al. |
| 2014/0257913 A1 | 9/2014 | Ball et al. |
| 2014/0350830 A1 | 11/2014 | David |
| 2014/0358592 A1 | 12/2014 | Wedig et al. |
| 2015/0046194 A1 | 2/2015 | Waddell et al. |
| 2015/0111524 A1 | 4/2015 | South |
| 2015/0154712 A1 | 6/2015 | Cook |
| 2017/0124116 A1 | 5/2017 | League |
| 2017/0177944 A1 | 6/2017 | Sloo et al. |

SENSOR DATA TO IDENTIFY CATASTROPHE AREAS

RELATED APPLICATIONS

The current patent application is a continuation of, and claims the benefit of, U.S. patent application Ser. No. 15/397,228, entitled "Sensor Data to Identify Catastrophe Areas" and filed Jan. 3, 2017, which is a non-provisional patent application which claims priority benefit to the following identically-titled U.S. Provisional Applications: Ser. No. 62/275,566, filed Jan. 6, 2016; and Ser. No. 62/307,101, filed Mar. 11, 2016. The listed earlier-filed applications are hereby incorporated by reference in their entireties into the current patent application. Further, the present non-provisional patent application is related to identically-titled non-provisional patent application Ser. No. 15/396,969, filed Jan. 3, 2017; and Ser. No. 15/397,277, filed Jan. 3, 2017.

FIELD OF THE INVENTION

The present disclosure generally relates to devices and methods for using sensor data to identify catastrophe areas.

BACKGROUND

Detection of and response to catastrophic events traditionally relies on public emergency detection and reporting sensor networks, such as the Integrated Public Alert and Warning System and Emergency Alert System. However, such public infrastructure is designed specifically with certain needs in mind—namely, public safety and alert notification—and may not be optimized for other uses. Further, underlying data gathered by public systems may not be made publically available in a useful format. Still further, public infrastructure may be underfunded, which may lead to incomplete data coverage with respect to geographical areas of interest and/or detectable event types. There is therefore a need for an improved system for detecting and responding to catastrophic events.

BRIEF SUMMARY

Embodiments of the present technology relate to computer-implemented methods, computing devices, and computer-readable media for detecting and responding to catastrophic events. The embodiments provide for receiving data generated by a plurality of sensors positioned in and around a plurality of houses or other structures, comparing the data against known thresholds or patterns indicative of catastrophic events, and generating responses and/or operational instructions if, for example, a catastrophic event is indicated. The embodiments may permit improved event detection and tracking—for example where the system automatically reconfigures a remote sensor network and/or data gathering regimes to improve data clarity around an event—and/or may improve the efficiency and accuracy of remedial response(s) to the event.

In a first aspect, a computer-implemented method for tracking a catastrophic event using a remote sensor network is provided. The method may include receiving and comparing a first set of event data against an event threshold to determine that the event threshold has been exceeded. A geographic boundary for an area associated with the first set of event data may also be identified. The boundary may encompass a plurality of sensors positioned in and around a plurality of structures such as houses. A data receipt pattern may also be determined based on the first set of event data, and a data file may be initialized to receive a second set of event data comprising sensor data from the plurality of sensors based on the receipt pattern. The sensor data may then be received into the data file. As a result, data gathering regarding a catastrophic event may be improved, preferably through optimization of system components and functions for an event type and use of "private" sensor networks in place of or in addition to public emergency notification systems. The method may include additional, fewer, or alternative actions, including those discussed elsewhere herein.

In another aspect, a computer-implemented method for detecting and generating an automated response to a catastrophic event may be provided. The method may include setting an event threshold that is for a first event type and that is configured for comparison against event data. The event data may be analyzed to determine that the event threshold has been exceeded by the event data and that the first event type has occurred. A geographic boundary for an area associated with the event data may be identified and may encompass a plurality of sensors positioned in and around a plurality of houses. A response may be automatically generated based on the first event type and the geographic boundary. As a result, the efficiency and accuracy of remedial reaction to a specific type of event may be improved, and/or impact of the event on persons or belongings may be alleviated. The method may include additional, fewer, or alternative actions, including those discussed elsewhere herein.

In yet another aspect, a computer-implemented method for generating an automated response to a catastrophic event may be provided. The method may include analyzing a sample set of data generated in association with a catastrophic event to determine a threshold pattern. Home sensor data may also be collected/received from a smart home controller via wireless communication or data transmission. The home sensor data may include data regarding at least one of (i) structural status; (ii) wind speed; (iii) availability of electricity; (iv) presence of water; (v) temperature; (vi) pressure; and/or (vii) presence of pollutants in the air and/or water. The home sensor data may be analyzed with reference to the threshold pattern to determine whether a match is present (indicating a catastrophic event has occurred or may have occurred). If a match is present, a response may be automatically generated. As a result, data gathering regarding a catastrophic event may be improved, preferably through optimization for an event type and use of "private" sensor networks in place of or in addition to public emergency notification systems. The method may include additional, fewer, or alternative actions, including those discussed elsewhere herein.

Advantages of these and other embodiments will become more apparent to those skilled in the art from the following description of the exemplary embodiments which have been shown and described by way of illustration. As will be realized, the present embodiments described herein may be capable of other and different embodiments, and their details are capable of modification in various respects. Accordingly, the drawings and description are to be regarded as illustrative in nature and not as restrictive.

BRIEF DESCRIPTION OF THE DRAWINGS

The Figures described below depict various aspects of devices and methods disclosed therein. It should be understood that each Figure depicts an embodiment of a particular aspect of the disclosed devices and methods, and that each of the Figures is intended to accord with a possible embodiment thereof. Further, wherever possible, the following description refers to the reference numerals included in the following Figures, in which features depicted in multiple Figures are designated with consistent reference numerals. The present embodiments are not limited to the precise arrangements and instrumentalities shown in the Figures.

The Figures depict exemplary embodiments for purposes of illustration only. One skilled in the art will readily recognize from the following discussion that alternative embodiments of the systems and methods illustrated herein may be employed without departing from the principles of the invention described herein.

DETAILED DESCRIPTION

The present embodiments described in this patent application and other possible embodiments address a computer-centric challenge or problem with a solution that is necessarily rooted in computer technology and may relate to, inter alia, devices and methods for tracking and/or generating automated responses to a catastrophic event using a remote sensor network. A plurality of sensors may be installed in and around a homeowner's house. The sensors may include motion and/or glass break detectors, contact sensors, door lock keypads, thermostats, security systems, anemometers, barometric pressure sensors, water sensors, air and/or water pollution detectors, and the like. The sensors may record data regarding the status of the house—such as glass breaks, electrical outages and/or other structural happenings, or the presence of water/flooding and/or other internal conditions—and/or physical measurements of external weather conditions and air and/or water pollution. In some embodiments, the sensors may detect external traffic-related conditions such as the presence of vehicles nearby.

The data may be transmitted from the sensors to a central hub which forwards the data to a computing device. At various intervals, the computing device may compare the data against pre-established thresholds and/or patterns indicative of the existence of one or more catastrophic events. The computing device may also receive data from external databases, such as weather tracking systems maintained by news services and/or the National Weather Service, which may also or alternatively be compared against pre-established thresholds, patterns and/or the sensor data to improve assessment of the potential catastrophic event(s). The results of the foregoing may result in reconfiguration of sensor operation and/or data gathering patterns to improve data clarity around a perceived event. The results of the foregoing may also or alternatively result in automated responses, such as generating a list of affected person(s) and/or recommending that an investigative team be dispatched to a specific locale.

Exemplary Computing System

Figure 1:
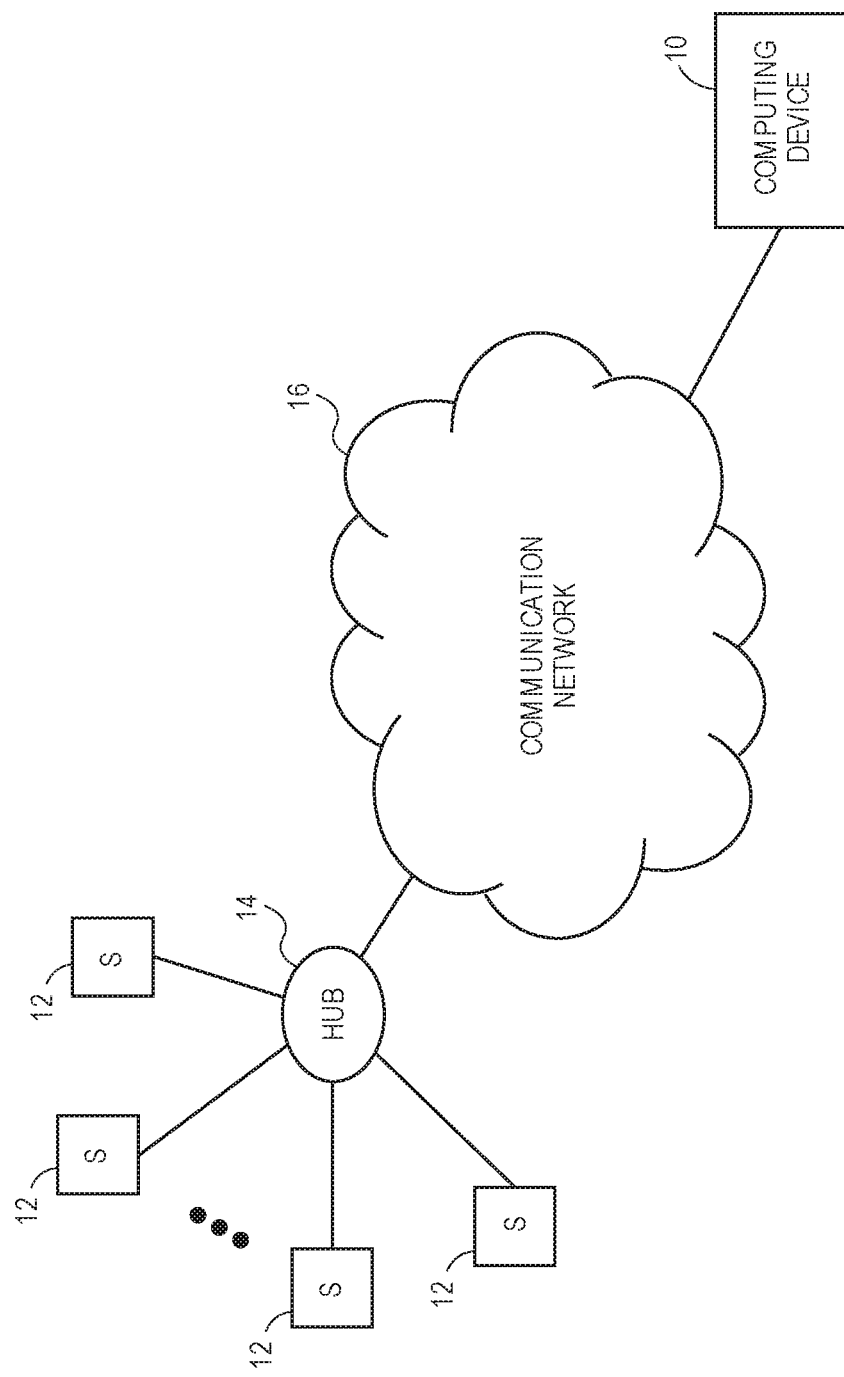
FIG. 1 illustrates an exemplary system, constructed in accordance with various embodiments, and including a computing device configured to receive data from a plurality of sensors through a communication network.

FIG. 1 depicts an exemplary environment in which embodiments of a computing device 10 for tracking and/or generating automated responses to catastrophic events may be utilized. The computing device 10 may receive data from a plurality of sensors 12 that are installed in and around a homeowner's house. The sensors 12 may transmit the data to a central hub 14, which in turn, transmits the data to the computing device 10 through a communication network 16.

Figure 2:
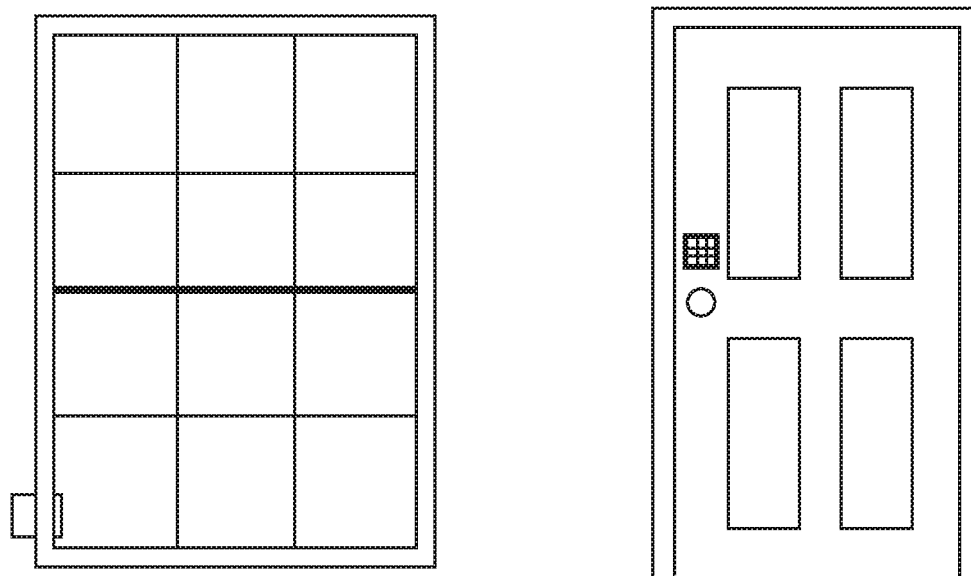
FIG. 2 illustrates a plurality of exemplary sensors that may be used with the system of FIG. 1.
Figure 2:
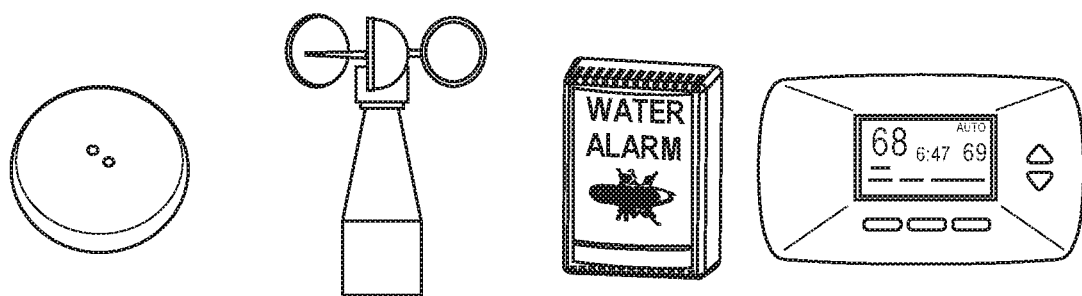

The sensors 12 may be distributed in and around the homeowner's house or may be carried by the homeowner or other residents of the house. Exemplary sensors 12 are shown in FIG. 2, but may include other sensors known for detecting physical states, properties and/or changes that are relevant to detection of a catastrophic event. Such sensors 12 may include glass break sensors installed on a window or wall to detect when glass is broken, thermostats that detect and set the temperature within the house, anemometers for detecting wind speed, water alarms for detecting the presence and/or level of water, current sensors or similar sensors that detect the availability of electricity on a house's circuit (s), infrared or other motion sensors, sensors for detecting the presence of vehicles, air and/or water pollutant detectors, and/or other similar sensors for detecting structural, weather, electrical and/or traffic-related information.

The sensors 12 each may include communications hardware that allow the sensor 12 to communicate, either through wires or wirelessly, with the central hub 14, which is typically located within the house. In other embodiments, the central hub 14 may not be utilized and each sensor 12 may communicate directly with the communication network 16.

Each sensor 12 may record, for example with a (time of day) timestamp, when activity occurred, such as when a wind condition occurred, when a glass break was detected, when electricity was lost from a circuit, and the like. After the event occurs, or at predetermined time intervals, the sensor 12 may transmit event data, such as in a data packet, which includes, for example, an identification of the sensor 12, a timestamp of when the activity occurred, and an indication of the activity recorded and its magnitude, where applicable (e.g., "wind speed" and "12 mph," respectively). This event data may be transmitted to the central hub 14 or to the computing device 10 (such as transmitting the event data to an insurance provider remote server for analysis against an event threshold to determine if an event has occurred and/or to establish a data receipt pattern).

The central hub 14 may include a plurality of ports (wired, wireless, or both) configured to receive data from the sensors 12 and at least one output port configured to transmit data to the communication network 16. The central hub 14 may further include buffering or other temporary data storage capabilities. As soon as the central hub 14 receives data from the sensors 12, or at predetermined intervals, the central hub 14 may transmit the data to the computing device 10 through the communication network 16. The central hub 14 in certain embodiments comprises a smart home controller.

The communication network 16 generally allows communication between the hub 14 and the computing device 10 or communication directly from the sensors 12 to the computing device 10. The communication network 16 may include local area networks, metro area networks, wide area networks, cloud networks, the Internet, and the like, or combinations thereof. The communication network 16 may be wired, wireless, or combinations thereof and may include components such as switches, routers, hubs, access points, and the like. The sensors 12 may connect to the communication network 16 either through wires, such as electrical cables or fiber optic cables, or wirelessly, such as radio frequency (RF) communication using wireless standards such as Bluetooth® or the Institute of Electrical and Electronic Engineers (IEEE) 802.11. In one embodiment, the sensors 12 may be wireless RF communication with each other or other sensors, with the hub 14 or smart home controller, communication network 16, external computing devices 10 or remote servers, user mobile devices (e.g., smart phones, smart watches, wearable electronics, etc.), and/or smart vehicles over radio links, nodes, or access points.

Figure 3:
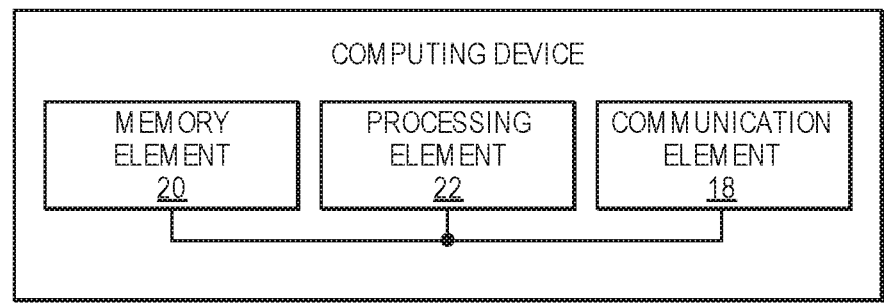
FIG. 3 illustrates various components of the computing device shown in block schematic form.

The computing device 10 may be embodied by workstation computers, desktop computers, laptop computers, palmtop computers, notebook computers, tablets or tablet computers, application servers, database servers, file servers, web servers, or the like, or combinations thereof. The computing device 10, as shown in FIG. 3, may broadly comprise a communication element 18, a memory element 20, and a processing element 22.

The communication element 18 generally allows the computing device 10 to receive data from the communication network 16. The communication element 18 may include signal or data transmitting and receiving circuits, such as antennas, amplifiers, filters, mixers, oscillators, digital signal processors (DSPs), and the like. The communication element 18 may establish communication wirelessly by utilizing RF signals and/or data that comply with communication standards such as cellular 2G, 3G, or 4G, IEEE 802.11 standard such as WiFi, IEEE 802.16 standard such as WiMAX, Bluetooth™, or combinations thereof. In addition, the communication element 18 may utilize communication standards such as ANT, ANT+, Bluetooth™ low energy (BLE), the industrial, scientific, and medical (ISM) band at 2.4 gigahertz (GHz), or the like. Alternatively, or in addition, the communication element 18 may establish communication through connectors or couplers that receive metal conductor wires or cables which are compatible with networking technologies such as Ethernet. In certain embodiments, the communication element 18 may also couple with optical fiber cables. The communication element 18 may be in communication with the processing element 22 and the memory element 20.

The memory element 20 may include electronic hardware data storage components such as read-only memory (ROM), programmable ROM, erasable programmable ROM, random-access memory (RAM) such as static RAM (SRAM) or dynamic RAM (DRAM), cache memory, hard disks, floppy disks, optical disks, flash memory, thumb drives, universal serial bus (USB) drives, or the like, or combinations thereof. In some embodiments, the memory element 20 may be embedded in, or packaged in the same package as, the processing element 22. The memory element 20 may include, or may constitute, a "computer-readable medium." The memory element 20 may store the instructions, code, code segments, software, firmware, programs, applications, apps, services, daemons, or the like that are executed by the processing element 22. The memory element 20 may also store settings, data, documents, sound files, photographs, movies, images, databases, and the like.

The processing element 22 may include electronic hardware components such as processors, microprocessors (single-core and multi-core), microcontrollers, digital signal processors (DSPs), field-programmable gate arrays (FPGAs), analog and/or digital application-specific integrated circuits (ASICs), or the like, or combinations thereof. The processing element 22 may generally execute, process, or run instructions, code, code segments, software, firmware, programs, applications, apps, processes, services, daemons, or the like. The processing element 22 may also include hardware components such as finite-state machines, sequential and combinational logic, and other electronic circuits that can perform the functions necessary for the operation of the current invention. The processing element 22 may be in communication with the other electronic components through serial or parallel links that include address busses, data busses, control lines, and the like.

The processing element 22 may be configured or programmed to perform the following functions through hardware, software, firmware, or combinations thereof. The processing element 22, through the communication element 18, may receive data from either the central hub 14 and/or the sensors 12. The processing element 22 may analyze the data received from the house (such as from a hub comprising a smart home controller) with the home owner's or resident's permission or affirmative consent.

At predetermined time intervals or upon receipt, the processing element 22 may parse, organize, analyze and/or summarize the event data. For example, every minute, hour, day, week, and/or month, the processing element 22 may analyze event data regarding the changing conditions and happenings in and around the houses by comparing it against event threshold(s) to determine whether the data indicate a catastrophic event may have occurred or is likely to occur. The processing element 22 may also or alternatively analyze the event data to determine whether additional clarity may be needed around an event or possible event, for example where additional and/or different event data may be required from the sensors 12 to track or confirm occurrence of an event.

If additional clarity is needed, the processing element 22 may determine a data receipt pattern based on the event data that is optimized to improve tracking and assessment of an event or possible event. For example, the processing element 22 may determine which event type(s) are most likely occurring or are most likely to occur by analyzing the event data, and may then determine a data profile or data receipt pattern based on what information is most likely to be useful going forward in the event analysis process. In an embodiment, event data may indicate the occurrence or likely occurrence of a first event type, which may in turn lead to more frequent data gathering/transmission and/or prioritization of one type of data over another, with the optimized set of such parameters for a given event type being referred to as the "data receipt pattern." This data receipt pattern may then lead to initialization of a data file for receiving such data, and the receipt of such data in the file. The data received according to the data receipt pattern, alternatively referred to herein as a "second set" of event data for the sake of clarity, is preferably sensor data received from a plurality of sensors situated in and around a plurality of structures, such as houses.

In addition to initializing a data file and receiving data according to the data receipt pattern, the processing element 22 may generate operational instructions for the sensor(s) 12 based on the analysis of event data. For example, the sensor(s) 12 may be instructed on a new configuration and/or parameter/setting that will enable the collection of the data required by the data receipt pattern. The operational instructions may be formatted for direct transmission to the sensor(s) 12 via communication network 16. The operational instructions may also be formatted as a request to an operator of the sensor(s) 12, for example in a requirements format specifying time, frequency, data type and other parameters that an operator such as a home alarm company may use to adjust the sensor(s) 12 and/or data collection methods accordingly. Likewise, event data from sensor(s) 12 may be provided via an operator such as a home alarm company without departing from the spirit of the present inventive concept. Preferably, metadata regarding certain types of event data is also provided, for example data regarding the construction of a house and/or the placement therein with reference to its layout, by the operator of the sensor(s) 12 to provide context for interpretation of event data.

Event thresholds may be set by the processing element 22 by correlating one or more properties of event data—preferably as derived from a sample set of data—with one or more event type(s). For example, a first event type may have one or multiple threshold(s) indicative of its occurrence. A hurricane event type may be indicated by a wind speed event threshold and a barometric pressure event threshold. Alternatively, a hurricane event type may be indicated by a single event threshold comprising a combination of these two properties. An electrical outage event type may be indicated by a single event threshold premised on a single property of the event data, such as a measure of electrical availability in a house. In this way, event threshold(s) may be set with reference to one or more event types and may be pre-set for periodic comparison against event data to determine if such event(s) are occurring or are likely to occur.

Event threshold(s) may also be finely tuned by the processing element 22 into a threshold pattern with reference to a particular collection of sensor(s) 12. For example, where a network of sensor(s) 12 of known type and location are included in a sensor network, it may be possible to analyze prior data from that area collected during occurrence of a prior event to determine a more customized threshold pattern for that event type. The threshold pattern should, of course, allow for error and natural variation, but should otherwise be finely tuned to recognize a series and set of conditions that commonly unfold during the occurrence of particular event type(s) in that area.

The processing element 22 may also access weather data, for example average wind speed data in tornadic conditions, from a database configured to store such data. The processing element 22 may use the weather data in developing event threshold(s) and/or threshold pattern(s), may use the weather data as event data for comparison against already-set event threshold(s), and/or may use the weather data to confirm or reject a conclusion that home sensor event data indicates the occurrence or likely future occurrence of a catastrophic event.

Preferably, processing element 22 will improve data collection and analysis by also identifying a geographic boundary for an area associated with event data triggering one or more event threshold(s). The boundary may encompass areas that appear to be or are likely to be affected by an event of the type indicated by the threshold(s), and may include additional space along its borders to allow for errors in prediction, such as errors in predicting wind pattern and direction of storm movement. Identifying the boundary may assist in developing a data receipt pattern, threshold pattern and/or operational instructions for the sensors 12. Identifying the boundary may also or alternatively inform the contents of an automated response, for example by identifying an area predicted to be affected by the event and/or proposing an area to which response personnel should be traveling. Further, identifying a boundary may permit identification of individual resident(s) in the area, such as customers holding insurance policies, who may need to be contacted regarding potential damage and/or insurance claims or the like. Moreover, the processing element 22 may receive data regarding insurance claims made by customer(s) in the area, and may cross-reference event data against such claims to detect fraud and/or prioritize response(s).

The processing element 22 may further receive metadata about the house, such as from other databases. For example, processing element 22 may receive such information from databases storing information entered in connection with an application for home owners insurance or the like. The processing element 22 may receive information about features of the house such as the address of the house, the age of the house, the construction materials of the house, the layout of the house, the number of bedrooms and bathrooms, and the like. This information may be useful in providing context for an interpretation of home sensor-derived event data. The processing element 22 may also receive information about the household or determine characteristics of the household from analysis of the data (e.g., image, audio, infrared, motion, and sensor data) received from the home (such as from the hub 14 or from another smart home controller).

Although the preferred embodiments relate to generating, collecting, and analyzing home sensor data at the processor element 22, the processor element 22 may receive and analyze other types of data as well. For instance, sensor data (such as telematics data) may be generated by vehicle-mounted sensors and collected by a smart vehicle controller/processors, remotely received over one or more RF radio links at the external computing device 10 over a communication network 16. Additionally or alternatively, sensor data (including but limited to sensor data) may be generated by mobile device-mounted sensors (e.g., sensors or cameras within a smart phone) and remotely received or collected over one or more RF radio links at the external computing device 10 over a communication network 16.

In addition to the foregoing, once the home-mounted sensor data, vehicle-mounted sensor data, mobile device sensor data, and/or other data (such as weather forecast or weather data) is received at the external computing device 10 via one or more radio links and the communication network 16, the external computing device 10 may apply one or more machine learning, object recognition, or optical character recognition techniques on the data to determine (1) that the sensor or other event data indicates that an event threshold has been exceeded or that an event exists; (2) a geographic boundary for an area impacted by the event (which may be based upon GPS (Global Positioning System) data or coordinates); and/or (3) a corrective action or response to the event, or the estimated or actual extent of the event.

For instance, a machine learning program (or object recognition program) residing on a memory associated with the computing device 10 may be trained to determine actual or estimated extent of a hurricane or other weather event, or other disaster, based upon historical image and sensor data (such as previous or historical home, mobile device, or vehicle sensor data received before, during, and after events). After which, newly received home, mobile device, or vehicle sensor data may be input by the computing device 10 into the trained machine learning program to determine (1) that an event threshold has been exceeded or that an event exists; (2) a geographic boundary for an area impacted by the event; and/or (3) a corrective action or response to the event (such as generate and transmit notifications to user mobile devices (i) recommending that they seek shelter, move out of the way of the event (for a moving whether event); or take alternate routes avoiding the area impacted by the event if traveling by vehicle; and/or (ii) determine an estimated amount of damage to insured assets within the area impacted by the event and prepared a proposed insurance claim for the insured's review and approval via their mobile device).

Exemplary Computer-Implemented Method

Figure 4:
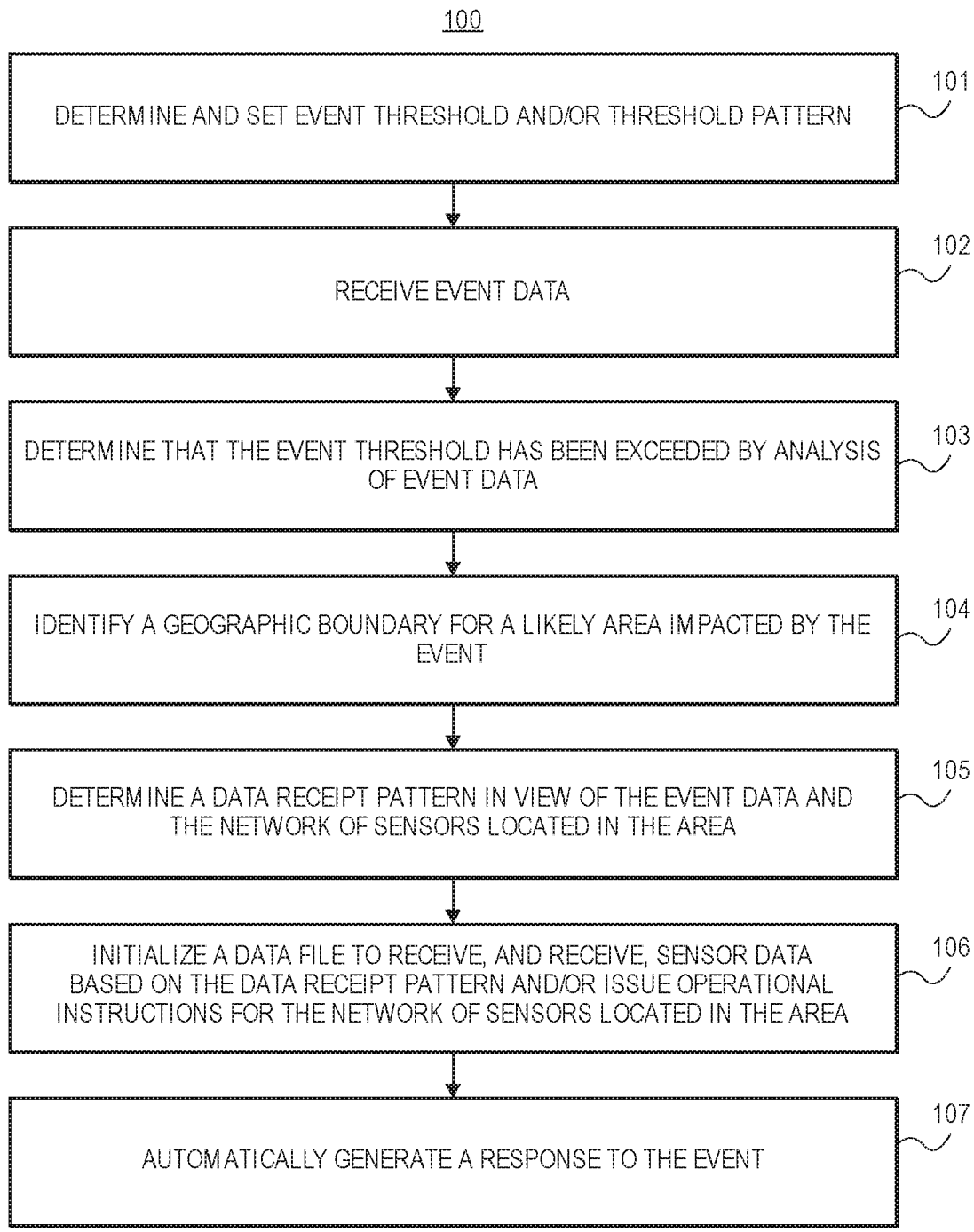
FIG. 4 illustrates at least a portion of the steps of an exemplary computer-implemented method for generating an automated response to a catastrophic event may be provided.

FIG. 4 depicts a listing of steps of an exemplary computer-implemented method 100 for generating an automated response to a catastrophic event. The steps may be performed in the order shown in FIG. 4, or they may be performed in a different order. Furthermore, some steps may be performed concurrently as opposed to sequentially. In addition, some steps may be optional. The steps of the computer-implemented method 100 may be performed by the computing device 10.

Referring to step 101, an event threshold and/or threshold pattern may be determined and set in association with one or more event types by the processing element 22. Event thresholds may be set by correlating one or more properties of event data—preferably as derived from a sample set of data—with one or more event type(s). A sample data set may include data generated by a plurality of sensors 12. Alternatively or in addition, a sample data set may be received from an external database, such as a database storing weather-related data from a previous occurrence of a catastrophic event. For example, a first event type may have one or multiple threshold(s) indicative of its occurrence. A hurricane event type may be indicated by a wind speed event threshold and a barometric pressure event threshold. Alternatively, a hurricane event type may be indicated by a single event threshold comprising a combination of these two properties, such as a weighted sum of the two properties. A volcanic event may be indicated by an air and/or water pollutant event threshold(s). An electrical outage event type may be indicated by a single event threshold premised on a single property of the event data, such as a measure of electrical availability in a house's circuit(s). In this way, event threshold(s) may be set for one or more event types and may be pre-set for comparison against event data to determine if such event(s) are occurring or are likely to occur.

Event threshold(s) may also be finely tuned by the processing element 22 into a threshold pattern with reference to a particular collection of sensor(s) 12. For example, where a network of sensor(s) of known type and location are included in a sensor network, it may be possible to analyze prior data from that area collected during occurrence of a prior event type to determine a threshold pattern for event data. The threshold pattern should, of course, allow for error and natural variation, but should otherwise be finely tuned to recognize a series and set of conditions that commonly unfold during the occurrence of particular event type(s) in that area.

Weather data accumulated from other sources may also be used, for example data regarding average wind speed in tornadic conditions as published by the National Weather Service and/or otherwise obtained from a database configured to store such data. The weather data may be used in developing event threshold(s) and/or threshold pattern(s), may be used as event data for comparison against already-set event threshold(s), and/or may be used to confirm or reject a conclusion that home sensor event data indicates the occurrence or likely future occurrence of a catastrophic event.

Referring to step 102, event data may be received from a network of sensors 12 or from an external source, such as a database for storing weather-related data. Sensors 12 may be distributed in and around homeowners' houses. Each sensor 12 may record, for example with a (time of day) timestamp, when activity occurred, such as when a wind condition occurred, when a glass break was detected, when electricity was lost from a circuit, and the like. After the event occurs, or at predetermined time intervals, the sensor 12 may transmit event data, such as in a data packet, which includes, for example, an identification of the sensor 12, a timestamp of when the activity occurred, and an indication of the activity recorded and its magnitude, where applicable (e.g., "wind speed" and "12 mph," respectively). This event data may be transmitted to central hub 14 or to the computing device 10 (such as transmitting the event data to an insurance provider remote server).

The sensors 12 each may include communications hardware that allow the sensor 12 to communicate, either through wires or wirelessly, with the central hub 14, which is typically located within the house. In other embodiments, the central hub 14 may not be utilized and each sensor 12 may communicate directly with the communication network 16 over one or more radio links. The central hub 14 may include a plurality of ports (wired, wireless, or both) configured to receive data from the sensors 12 and at least one output port configured to transmit data to the communication network 16 (over one or more radio links). The central hub 14 may further include buffering or other temporary data storage capabilities. As soon as the central hub 14 receives data from the sensors 12, or at predetermined intervals, the central hub 14 may transmit the data to the computing device 10 through the communication network 16 over one or more radio links. The central hub 14 in certain embodiments comprises a smart home controller. The communication network 16 generally allows communication between the hub 14 and the computing device 10 or communication directly from the sensors 12 to the computing device 10, over one or more radio links. The sensors 12 may connect to the communication network 16 either through wires, such as electrical cables or fiber optic cables, or wirelessly (over one or more radio links). Event data from sensor(s) 12 may also or alternatively be provided via an operator such as a home alarm company without departing from the spirit of the present inventive concept.

Referring to step 103, event data may be analyzed with reference to the event threshold and/or threshold pattern to determine that the threshold has been exceeded. For example, event data from a sensor 12 and/or from a weather-related database may indicate a particular wind speed was recorded at a specified location. This wind speed event data may be compared periodically or upon receipt by a computing device 10 with an event threshold including the property of wind speed as being indicative of at least one event type, alone or in combination with other properties. If the recorded wind speed from the event data meets or exceeds such an event threshold, the computing device 10 may determine that a receipt pattern, operational instructions for the sensors 12, and/or an automated response should be generated, and/or it may seek to confirm the determination using a "supplemental," and preferably independent, source of information as described in further detail below.

Preferably, metadata regarding certain types of event data is also collected, for example data regarding the construction of a house and/or sensor placement therein with reference to its layout. This may help to provide context for interpretation of event data. For example, knowing the direction a window is facing with reference to a wind gust, the type of window installed, and perhaps the age of the structure, may inform a comparison of event data against event threshold(s), e.g., by providing context for analyzing event data indicating a glass break correlated with the wind gust. Such metadata may be collected from external databases, such as databases managed by service and/or materials providers, home alarm companies, builders, and others.

Referring to step 104, data collection and analysis will preferably be improved by also identifying a geographic boundary for an area associated with event data exceeding one or more event threshold(s). The boundary may encompass areas that appear to be or are likely to be affected by an event of the type indicated by the threshold(s), and may include additional space along the borders of the boundary to allow for errors in prediction, such as errors in predicting wind pattern and direction of storm movement. Identifying the boundary may assist in developing a data receipt pattern and/or operational instructions for the sensors 12. Identifying the boundary may also or alternatively inform the contents of an automated response, for example by identifying an area predicted to be affected by the event and/or proposing an area to which response personnel should be traveling. Further, identifying a boundary may permit identification of individual resident(s) in the area, such as customers holding insurance policies, who may need to be contacted regarding potential damage and/or insurance claims or the like. Moreover, data regarding insurance claims made by customer(s) in the area may be received and cross-referenced against event data to detect fraud and/or prioritize response(s).

Referring to step 105, a data receipt pattern may be determined using the event data, with such determination preferably taking into account the geographic boundary determined in step 104 and a network of sensors 12 encompassed thereby. The data receipt pattern may be determined based on the event data, and may represent an optimal data-gathering approach for improved tracking and assessment of a detected event or possible event. For example, it may be determined which event type(s) are most likely occurring or are most likely to occur by analyzing the event data, and a data profile or data receipt pattern may be determined based on what information is most likely to be useful going forward in the event analysis process for such event type(s). In an embodiment, event data may indicate the occurrence or likely occurrence of a first event type, which may in turn lead to more frequent data gathering/transmission and/or prioritization of one type of data over another, and/or one type of sensor over another, with the optimized set of such parameters for a given event type being its preferred data receipt pattern.

The data receipt pattern may then lead to initialization of a data file for receiving such data, and the receipt of such data in the file at step 106. Also or alternatively at step 106, operational instructions for the sensor(s) 12 may be generated based on the analysis of event data. For example, the sensor(s) 12 within the geographic boundary determined at step 104 may be instructed on a new configuration and/or parameter/setting that will enable the collection of the data required by the data receipt pattern. The operational instructions may be formatted for direct transmission to the sensor(s) 12 via communication network 16. The operational instructions may also be formatted as a request to an operator of the sensor(s) 12, for example in a requirements format specifying time, frequency, data type and other parameters that an operator such as a home alarm company may use to adjust the sensor(s) 12 and/or data collection methods accordingly.

Referring to step 107, a response to the catastrophic event may be automatically generated, and may be embodied in a digital and/or printed report detailing the response. The response may take the form of a recommendation for deployment of a team of investigators to the area within the geographic boundary determined in step 104, a list of customers and/or insurance claims made within the geographic boundary, and/or a list of contact information for customers that may be affected by the event.

One or more of the foregoing steps may optionally be implemented in conjunction with and/or through execution of a machine learning program. The machine learning program may include curve fitting, regression model builders, convolutional or deep learning neural networks, Bayesian machine learning techniques, or the like. The machine learning program may associate patterns from home sensor data with known events to inform generation of data receipt patterns and/or event threshold(s), iteratively improve the form and contents of responses and/or operational instructions to sensors through analyzing data regarding the efficacy of such measures over multiple events, and the like.

Other types of algorithms may also be applied to the sensor, weather, and other data received—such as object recognition or optical character recognition techniques. In additional to home sensor data, vehicle sensor data and mobile device generated data may also be collected and input to trained or other machine learning, object recognition, or optical character recognition programs and techniques to identify events, geographic boundaries of events, and proposed or recommended responses to the events.

Exemplary Computer-Implemented Method for Generating an Automated Response to a Catastophic Event In yet another aspect, a computer-implemented method for generating an automated response to a catastrophic event may be provided. The method may include analyzing a sample set of data generated in association with a catastrophic event to determine a threshold pattern. Home sensor data may also be collected/received from a smart home controller via wireless communication or data transmission. The home sensor data may include data regarding at least one of (i) structural status; (ii) wind speed; (iii) availability of electricity; (iv) presence of water; (v) temperature; (vi) pressure; and/or (vii) presence of pollutants in the air and/or water. The home sensor data may be analyzed with reference to the threshold pattern to determine whether a match is present (indicating a catastrophic event has occurred or may have occurred). If a match is present, a response may be automatically generated. As a result, data gathering regarding a catastrophic event may be improved, preferably through optimization for an event type and use of "private" sensor networks in place of or in addition to public emergency notification systems. The method may include additional, fewer, or alternative actions, including those discussed elsewhere herein.

For instance, an automated response may rely on event data and a geographic boundary developed therefrom to issue a deployment schedule for a team of investigators tasked with developing facts regarding actual or potential insurance claims. It may be suggested that the team begin in the area(s) within the boundary that reported the most severe home sensor data for a particular catastrophic event. The team may then be directed to work backward toward the less severely-affected areas.

The schedule or other response may also be informed and/or adjusted by considering a supplemental data set, such as reports or data from a weather-tracking database that may help confirm occurrence of the event and/or provide additional support for planning a deployment schedule. The schedule may also be informed by the results of prior deployments. For instance, previous severity analyses and responses within the geographic boundary may have led to a first deployment schedule. Once the deployed team enters its findings from its investigations, however, the severity analyses may take such findings into account to develop a better-configured deployment schedule for a future event.

In another example, an automated response may include generation of a list of person(s) residing within the geographic boundary and associated contact information, insurance claims for damages within the geographic boundaries, and/or recommendations for people to contact for additional remote investigation.

In the embodiments using home sensor data to identify air or water pollution at one or more homes, the sensor data indicating pollution may indicate the extent of an event, such as the extent of a chemical or oil spill. For instance, a train carrying chemicals or oil may be derailed and leak the chemicals or oil into a water source, such as a river or creek. The home mounted sensors may ultimately detect that the chemicals or oil have seeped or leaked into the water supply. Unknown long-term events or pollution, and the geographical extent thereof, may also be detected. For instance, chemical leakage or smoke/air emissions from a factory may pollute the air or water in a given area or neighborhood. Home sensor data indicating air or water pollution from several homes may be used to identify the extent or scope of the pollution or impacted area. After which, notifications may be sent those homeowners, or emergency responders may be sent to the impacted area for clean up.

Exemplary Computing Device for Tracking a Catastrophic Event Using a Remote Sensor Network In another aspect, a network computing device for tracking a catastrophic event using a remote sensor network may be provided. The network computing device may include a communication element, a memory element, and/or a processing element. The communication element may receive data generated by a plurality of sensors positioned in and around a house. The memory element may be electronically coupled to the communication element and may store data and executable instructions. The processing element may be electronically coupled to the communication element and the memory element. The processing element may be configured to determine that an event threshold has been exceeded, the event threshold being configured for comparison against the event data. The processing element may further be configured to determine a data receipt pattern based on the event data, to initialize a data file to receive additional sensor data from the plurality of sensors based on the data receipt pattern, and to receive the additional sensor data into the data file. The network computing device may include additional, fewer, or alternate components and/or functionality, including that discussed elsewhere herein.

The processing element may be further configured to issue operational instructions to at least some of the plurality of sensors based on the data receipt pattern and via the communication element. The processing element may be further configured to format the operational instructions for transmission to the plurality of sensors via communication network. The processing element may also or alternatively be further configured to format the operational instructions for routing to an operator of the plurality of sensors.

Exemplary Computer-Readable Medium for Tracking A Catastrohpic Event Using a Remote Sensor Network In yet another aspect, a computer-readable medium for tracking a catastrophic event using a remote sensor network may be provided. The computer-readable medium may include an executable program stored thereon, wherein the program instructs a processing element of a network computing device to perform the following: (1) determine that an event threshold has been exceeded, the event threshold being configured for comparison against event data; (2) identify a geographic boundary for an area associated with the event data, the boundary encompassing a plurality of sensors positioned in and around a plurality of houses; (3) determine a data receipt pattern based on the event data; initialize a data file, based on the data receipt pattern, to receive sensor data from the plurality of sensors; and/or (4) receive the sensor data into the data file. The program stored on the computer-readable medium may instruct the processing element to perform additional, fewer, or alternative actions, including those discussed elsewhere herein.

For instance, the program may instruct the processing element to issue operational instructions to at least some of the plurality of sensors based on the data receipt pattern and via the communication element. The program may further instruct the processing element to format the operational instructions for transmission to the plurality of sensors via communication network. The program may also or alternatively instruct the processing element to format the operational instructions for routing to an operator of the plurality of sensors.

Exemplary Functionality

The present embodiments may involve smart home technology and/or smart home controller collecting and analyzing data collected from home-mounted and other sensors. The data may be analyzed locally or remotely (by one or more local or remote processors) as a sample data set to determine and/or adjust one or more event threshold(s) or threshold pattern(s). Such event data may also or alternatively be analyzed to determine whether an event threshold or threshold pattern has been met, indicating occurrence or likely occurrence of a catastrophic event.

The smart home controller may transmit the data collected periodically, or upon request, to an insurance provider remote server for analysis. For instance, the smart home controller may wirelessly communicate the sensor and/or other data collected every twelve (12) to twenty-four (24) hours.

One embodiment may use data from home security systems, smart homes, and other connected devices. Such information may be gathered from sensors and systems such as glass break sensors installed on a window or wall to detect when glass is broken, thermostats that detect and set the temperature within the house, anemometers for detecting wind speed, water alarms for detecting the presence and/or level of water, current sensors or similar sensors that detect the availability of electricity on a house's circuit(s), infrared or other motion sensors, sensors for detecting the presence of vehicles, air and/or water pollutant detectors, and/or other similar sensors for detecting structural, weather, electrical and/or traffic-related information. Through continual collection and analysis, a model may be created to guide tracking and response to catastrophic events. This may be done using either supervised or unsupervised machine learning.

The solution may include: (1) setting an event threshold that is for a first event type and that is configured for comparison against event data; (2) analyzing the event data to determine that the event threshold has been exceeded by the event data and that the first event type has occurred; (3) identifying a geographic boundary for an area associated with the event data, the boundary encompassing a plurality of sensors positioned in and around a plurality of houses;

and/or (4) automatically generating a response based on the first event type and the geographic boundary. The solution may further include comparison of a set of insurance claims against a list of person(s) residing within the geographic boundary. The solution may further include confirming the occurrence of the first event type by comparison of the event data and/or event threshold with a supplemental data set, the supplemental data set including weather-related data received from an external database configured for weather tracking.

In another aspect, a non-transitory computer-readable medium with an executable program stored thereon may be provided for detecting and generating an automated response to a catastrophic event. The program may instruct a processing element of a computing device to: (1) set an event threshold that is for a first event type and that is configured for comparison against event data; (2) analyze the event data to determine that the event threshold has been exceeded by the event data, and that the first event type has occurred; (3) identify a geographic boundary for an area associated with the event data, the boundary encompassing a plurality of sensors positioned in and around a plurality of houses; and/or (4) automatically generate a response based on the first event type and the geographic boundary.

In another aspect, a computing device for detecting and generating an automated response to a catastrophic event may be provided. The computing device may include a communication element configured to receive event data generated by a plurality of sensors positioned in and around a house. The computing device may further include a memory element electronically coupled to the communication element, the memory element configured to store data and executable instructions. The computing device may further include a processing element electronically coupled to the communication element and the memory element. The processing element may be configured to: (1) set an event threshold that is for a first event type and that is configured for comparison against the event data; (2) analyze the event data to determine that the event threshold has been exceeded by the event data, and that the first event type has occurred; (3) identify a geographic boundary for an area associated with the event data, the boundary encompassing the plurality of sensors; and/or (4) automatically generate a response based on the first event type and the geographic boundary. The computing device may include additional, less, or alternate functionality, including that discussed elsewhere herein.

For instance, the response may include the computing device (i) determining a GPS location of a customer based upon vehicle or mobile device GPS location; (ii) determining that the GPS location of the customer is within the geographic boundary for the area associated with the event; and (iii) if so, generating an alternate route for the vehicle of the customer to take and transmitting the alternate route to their vehicle to alleviate impact of the event on the customer and/or their vehicle. Additionally or alternatively, the response may include the external computing device and/or associated transceiver: (i) determining that a customer vehicle is moving from analysis of sensor data received via wireless communication over a radio link; (ii) determining a GPS location of a customer (such as based upon the customer vehicle or mobile device GPS location) for the sensor data received; (iii) determining that the GPS location of the customer vehicle is within the geographic boundary for the area associated with the event; (iv) if so, generating an alternate route for the customer vehicle to take to minimize impact of the event on the customer and/or customer vehicle; and/or (v) transmitting the alternate route such that customer may drive the vehicle according to the alternate route, or that the vehicle may automatically divert to the alternate route with the customer's permission (such as in the case of an autonomous vehicle or self-driving vehicle). The computing device may generate other types of responses, including those discussed elsewhere herein.

In another aspect, a computer system for generating an automated response to a catastrophic event may be provided. The computer system may include one or more processors and/or transceivers configured to: (1) analyze a sample set of data generated in association with a catastrophic event to determine a threshold pattern; (2) receive home sensor data from a smart home controller via wireless communication or data transmission, the home sensor data including data regarding at least one of (i) structural status; (ii) wind speed; (iii) availability of electricity; (iv) presence of water; (v) temperature; (vi) pressure; and/or (vii) presence of pollutants in the air and/or water; (3) determine based upon or from computer analysis of the home sensor data, whether the home sensor data indicates a match to the threshold pattern; and/or (4) automatically generate a response if the home sensor data indicates a match to the threshold pattern.

The one or more processors and transceivers may further be configured to: issue operational instructions to the smart home controller to reconfigure for collection of additional home sensor data. The one or more processors and transceivers may also or alternatively be configured to confirm the occurrence of the catastrophic event by analyzing a supplemental data set, the supplemental data set including weather-related data received from an external database configured for weather tracking. The system may include additional, less, or alternate functionality, including that discussed elsewhere herein.

Exemplary Embodiments

The present embodiments may relate to using real-time regional home sensor data to better identify areas affected by catastrophes or noncatastrophe losses. The solution assumes that real-time home sensor data is available. By monitoring real-time home sensor data (with customer permission) or receiving reports from vendors based on real-time home sensor data, an insurance provider may identify areas/policyholders that reported erratic home sensor data and perhaps ceased reporting data (in this case, it should be verified that it's not simply a power outage). Such data may be used to prioritize which policyholders are contacted first and where the catastrophe team is sent to, and to verify reported claims against the home telematics data, and/or other data, such as sensor, image, and audio data.

The present embodiments may (1) collect sensor data (door/window/glass sensors, water sensor, temperature, air and/or water pollution, etc.) from a geographic region; (2) match the (home or vehicle) telematics data with known catastrophes (hurricane, wind/hail, earthquake, and brushfire) and non-cat losses (theft); (3) identify sensor reporting patterns with types of loss events and set thresholds based upon the patterns (for instance, sensor data may be received from several hundred homes, and if all or most of the home sensors are reporting abnormal or dangerous conditions, or if there is a spike of sensor data from multiple homes indicating abnormal or dangerous conditions, an actual event may be presumed to be occurring); and/or (4) when a real-time sensor reporting pattern matches a pre-determined threshold, it may trigger an event. At this time some cross-checking with weather data may be warranted. With the present embodiments, (5) a triggered event may entail contacting policyholders in the affected area, supplying the CAT response team with additional information, or notifying policyholders of recent occurrences in the area.

After the event has passed, the sensor data associated with, or acquired, before, during, and after the event may collected and analyzed, such as via a machine learning or object recognition technique, to determine an extent of damage to insured assets, such as a home, vehicle, or personal belongings. A proposed insurance claim, based upon the extent of damage determined or estimated, may be generated and transmitted to the insured's mobile device via one or more radio links for their review and/or approval.

In one aspect, a computer-implemented method of generating proposed corrective actions to insurance-related events may be provided. The method may include: (1) receiving, at one or more processors and/or transceivers over one or more radio links, via wireless communication or data transmission, a first set of data (such as weather data, and/or sensor data (such as home-mounted, vehicle-mounted, and/or mobile device-mounted sensor (or image) data, and/or home or vehicle telematics data); (2) inputting, at the one or more processors, the first set of data into a machine learning or object recognition program (or data pattern recognition technique or program) to determine or identify an insurance-related event, or otherwise determining or identifying, at the one or more processors, the insurance-related event from computer analysis of the first set of data received; (3) generating, at the one or more processors, a geographic boundary of an area associated with the insurance-related event, or an actual or forecast extent thereof from computer analysis of the first set of data and/or by inputting the first set of data into the machine learning or object recognition program (or data pattern recognition technique or program) to determine the geographic boundary of the event; (4) receiving, at the one or more processors and/or transceivers over one or more radio links, via wireless communication or data transmission, a second set of data (such as customer-specific data, including GPS or sensor data (such as home-mounted, vehicle-mounted, and/or mobile device-mounted sensor (or image) data, and/or home or vehicle telematics data); (5) determining, at the one or more processors, that a GPS location of a customer is within, or may be in proximity, to the geographic boundary or the event, the GPS location being determined from a GPS coordinates within the second set of data (such as GPS location of a smart home controller, smart vehicle, or mobile device); (6) if so, generating a response or corrective action, at the one or more processors; and/or (7) transmitting, from the one or more processors and/or associated transceivers, the response to a smart home controller, vehicle controller, or mobile device of the customer using wireless communication and over one or more radio links to alleviate impact of the insurance-related event on insureds and/or insured assets (such as vehicles or homes).

The method may be implemented via one or more local or remote processors and transceivers, and/or via computer-executable instructions stored on computer-readable media or medium. The method may include additional, less, or alternate actions, including those discussed elsewhere herein.

For instance, the response or corrective action may be an electronic message that is transmitted to the customer's mobile device warning them of an impending insurance-related path, a path thereof, and an estimated intensity thereof at their current GPS location. The response or corrective action may be determining or estimating, at the one or more processors, an extent of damage to customer or insured assets (such as personal belongings, homes, or vehicles) caused by the insurance-related event based upon the first and/or second set of data, such as by inputting the first and/or second set of data received into a machine learning, object recognition, or pattern recognition program that is trained using historical images to identify damage and/or the extent thereof. The one or more processors may be further configured to generate a proposed virtual insurance claim for the customer using the extent of damage estimated using the first and/or second set of data, and/or transmit the proposed virtual insurance claim to the customer's mobile device for their review, approval, or modification.

The response or corrective action may be generating, at the one or more processors, a request that emergency or EMS personnel be sent to the GPS location of the customer (such as the current GPS location of their mobile device, home, or vehicle controller contained within the second set of sensor data); and/or transmitting, from the one or more processors and/or associated transceivers, over one or more radio links via wireless communication or data transmission to a computing device or remote server associated with a police or fire department, or hospital.

The response or corrective action may include (i) determining a GPS location of a customer based upon vehicle or mobile device GPS location; (ii) determining that the GPS location of the customer is within the geographic boundary for the area associated with the event; and (iii) if so, generating an alternate route for the vehicle of the customer to take and transmitting the alternate route to their vehicle to alleviate impact of the event on the customer and/or their vehicle. Additionally or alternatively, the response or corrective action may include, at an external computing device and/or associated transceiver: (i) determining that a customer vehicle is moving from analysis of sensor data received via wireless communication over a radio link; (ii) determining a GPS location of a customer (such as based upon the customer vehicle or mobile device GPS location) for the sensor data received; (iii) determining that the GPS location of the customer vehicle is within the geographic boundary for the area associated with the event; (iv) if so, generating an alternate route for the customer vehicle to take to minimize impact of the event on the customer and/or customer vehicle; and/or (v) transmitting the alternate route over one or more radio links such that customer may drive the vehicle according to the alternate route, or that the vehicle may automatically divert to the alternate route with the customer's permission (such as in the case of an autonomous vehicle or self-driving vehicle).

In another aspect, a computer system for generating proposed corrective actions to insurance-related events may be provided. The computer system may include one or more processors and/or transceivers configured to: (1) receive over one or more radio links, via wireless communication or data transmission, a first set of data (such as weather data, and/or sensor data (such as home-mounted, vehicle-mounted, and/or mobile device-mounted sensor (or image) data, and/or home or vehicle telematics data); (2) input the first set of data into a machine learning or object recognition program (or data pattern recognition technique or program) to determine or identify an insurance-related event, or otherwise determining or identifying, at the one or more processors, the insurance-related event from computer analysis of the first set of data received; (3) generate a geographic boundary of an area associated with the insurance-related event, or an actual or forecast extent thereof from computer analysis of the first set of data and/or by inputting the first set of data into the machine learning or object recognition program (or data pattern recognition technique or program) to determine the geographic boundary of the event; (4) receive over one or more radio links, via wireless communication or data transmission, a second set of data (such as customer-specific data, including GPS or sensor data (such as home-mounted, vehicle-mounted, and/or mobile device-mounted sensor (or image) data, and/or home or vehicle telematics data); (5) determine that a GPS location of a customer is within, or may be in proximity, to the geographic boundary or the event, the GPS location being determined from a GPS coordinates within the second set of data (such as GPS location of a smart home controller, smart vehicle, or mobile device); (6) if so, generate a response or corrective action; and/or (7) transmit the response to a smart home controller, vehicle controller, or mobile device of the customer using wireless communication and over one or more radio links to alleviate impact of the insurance-related event on insureds and/or insured assets (such as vehicles or homes).

The computer system may include additional, less, or alternate functionality. For instance, the response or corrective action may be an electronic message that is transmitted to the customer's mobile device warning them of an impending insurance-related path, a path thereof, and an estimated intensity thereof at their current GPS location. The response or corrective action may be determining or estimating, at the one or more processors, an extent of damage to customer or insured assets (such as personal belongings, homes, or vehicles) caused by the insurance-related event based upon the first and/or second set of data, such as by inputting the first and/or second set of data received into a machine learning, object recognition, or pattern recognition program that is trained using historical images to identify damage and/or the extent thereof. The one or more processors may be further configured to generate a proposed virtual insurance claim for the customer using the extent of damage estimated using the first and/or second set of data, and/or transmit the proposed virtual insurance claim to the customer's mobile device for their review, approval, or modification.

The response or corrective action may include generating, at the one or more processors, a request that emergency or EMS personnel be sent to the GPS location of the customer (such as the current GPS location of their mobile device, home, or vehicle controller contained within the second set of sensor data); and/or transmitting, from the one or more processors and/or associated transceivers, over one or more radio links via wireless communication or data transmission to a computing device or remote server associated with a police or fire department, or hospital.

The response or corrective action may include the one or more processors being configured to (i) determine a GPS location of a customer based upon vehicle or mobile device GPS location; (ii) determine that the GPS location of the customer is within the geographic boundary for the area associated with the event; and (iii) if so, generate an alternate route for an autonomous vehicle or the customer to take and transmit the alternate route to their autonomous or other vehicle to alleviate impact of the event on the customer and/or their autonomous or other vehicle. Additionally or alternatively, the response or corrective action may include, at an external computing device and/or associated transceiver: (i) determining that a customer vehicle is moving from analysis of sensor data received via wireless communication over a radio link; (ii) determining a GPS location of a customer (such as based upon the customer vehicle or mobile device GPS location) for the sensor data received; (iii) determining that the GPS location of the customer vehicle is within the geographic boundary for the area associated with the event; (iv) if so, generating an alternate route for the customer vehicle to take to minimize impact of the event on the customer and/or customer vehicle; and/or (v) transmitting the alternate route over one or more radio links such that customer may drive the vehicle according to the alternate route, or that the vehicle may automatically divert to the alternate route with the customer's permission (such as in the case of an autonomous vehicle or self-driving vehicle).

Additional Considerations

With the foregoing, an insurance customer may opt-in to a rewards, insurance discount, or other type of program. After the insurance customer provides their affirmative consent, an insurance provider telematics application and/or remote server may collect smart home, mobile device, vehicle, telematics and/or other data (including image or audio data) associated with insured assets, including before, during, and/or after an insurance-related event. In return, risk-averse home and/or vehicle owners may receive discounts or insurance cost savings related to auto, home, life, renters, pet, and other types of insurance from the insurance provider.

In one aspect, sensor data may be collected or received by an insured's smart home, mobile device or smart vehicle, and/or an insurance provider remote server, such as via direct or indirect wireless communication or data transmission from an application running on the insured's smart home controller, mobile device or vehicle, after the insured or customer affirmatively consents or otherwise opts-in to an insurance discount, reward, or other program. The insurance provider may then analyze the data received with the customer's permission to provide benefits to the customer. As a result, risk-averse customers may receive insurance discounts or other insurance cost savings based upon functionality and/or technology discussed herein that may mitigate or prevent risk to (i) insured assets, such as vehicles or even homes, and/or (ii) insureds and family members caused by insurance-related events.

In this description, references to "one embodiment", "an embodiment", or "embodiments" mean that the feature or features being referred to are included in at least one embodiment of the technology. Separate references to "one embodiment", "an embodiment", or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments, but is not necessarily included. Thus, the current technology can include a variety of combinations and/or integrations of the embodiments described herein.

Although the present application sets forth a detailed description of numerous different embodiments, it should be understood that the legal scope of the description is defined by the words of the claims set forth at the end of this patent and equivalents. The detailed description is to be construed as exemplary only and does not describe every possible embodiment since describing every possible embodiment would be impractical. Numerous alternative embodiments may be implemented, using either current technology or technology developed after the filing date of this patent, which would still fall within the scope of the claims.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of routines, subroutines, applications, or instructions. These may constitute either software (e.g., code embodied on a machine-readable medium or in a transmission signal) or hardware. In hardware, the routines, etc., are tangible units capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as computer hardware that operates to perform certain operations as described herein.

In various embodiments, computer hardware, such as a processing element, may be implemented as special purpose or as general purpose. For example, the processing element may comprise dedicated circuitry or logic that is permanently configured, such as an application-specific integrated circuit (ASIC), or indefinitely configured, such as an FPGA, to perform certain operations. The processing element may also comprise programmable logic or circuitry (e.g., as encompassed within a general-purpose processor or other programmable processor) that is temporarily configured by software to perform certain operations. It will be appreciated that the decision to implement the processing element as special purpose, in dedicated and permanently configured circuitry, or as general purpose (e.g., configured by software) may be driven by cost and time considerations.

Accordingly, the term "processing element" or equivalents should be understood to encompass a tangible entity, be that an entity that is physically constructed, permanently configured (e.g., hardwired), or temporarily configured (e.g., programmed) to operate in a certain manner or to perform certain operations described herein. Considering embodiments in which the processing element is temporarily configured (e.g., programmed), each of the processing elements need not be configured or instantiated at any one instance in time. For example, where the processing element comprises a general-purpose processor configured using software, the general-purpose processor may be configured as respective different processing elements at different times. Software may accordingly configure the processing element to constitute a particular hardware configuration at one instance of time and to constitute a different hardware configuration at a different instance of time.

Computer hardware components, such as communication elements, memory elements, processing elements, and the like, may provide information to, and receive information from, other computer hardware components. Accordingly, the described computer hardware components may be regarded as being communicatively coupled. Where multiple of such computer hardware components exist contemporaneously, communications may be achieved through signal transmission (e.g., over appropriate circuits and buses) that connect the computer hardware components. In embodiments in which multiple computer hardware components are configured or instantiated at different times, communications between such computer hardware components may be achieved, for example, through the storage and retrieval of information in memory structures to which the multiple computer hardware components have access. For example, one computer hardware component may perform an operation and store the output of that operation in a memory device to which it is communicatively coupled. A further computer hardware component may then, at a later time, access the memory device to retrieve and process the stored output. Computer hardware components may also initiate communications with input or output devices, and may operate on a resource (e.g., a collection of information).

The various operations of example methods described herein may be performed, at least partially, by one or more processing elements that are temporarily configured (e.g., by software) or permanently configured to perform the relevant operations. Whether temporarily or permanently configured, such processing elements may constitute processing element-implemented modules that operate to perform one or more operations or functions. The modules referred to herein may, in some example embodiments, comprise processing element-implemented modules.

Similarly, the methods or routines described herein may be at least partially processing element-implemented. For example, at least some of the operations of a method may be performed by one or more processing elements or processing element-implemented hardware modules. The performance of certain of the operations may be distributed among the one or more processing elements, not only residing within a single machine, but deployed across a number of machines. In some example embodiments, the processing elements may be located in a single location (e.g., within a home environment, an office environment or as a server farm), while in other embodiments the processing elements may be distributed across a number of locations.

Unless specifically stated otherwise, discussions herein using words such as "processing," "computing," "calculating," "determining," "presenting," "displaying," or the like may refer to actions or processes of a machine (e.g., a computer with a processing element and other computer hardware components) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus.

The patent claims at the end of this patent application are not intended to be construed under 35 U.S.C. § 112(f) unless traditional means-plus-function language is expressly recited, such as "means for" or "step for" language being explicitly recited in the claim(s).

Although the invention has been described with reference to the embodiments illustrated in the attached drawing figures, it is noted that equivalents may be employed and substitutions made herein without departing from the scope of the invention as recited in the claims.

Having thus described various embodiments of the invention, what is claimed as new and desired to be protected by Letters Patent includes the following:

We claim:

1. A computer-implemented method for detecting and generating an automated response to a catastrophic event, the computer-implemented method comprising:
   analyzing event data generated by a plurality of sensors positioned in and around a plurality of structures to determine that an event threshold for a first event type has been met or exceeded by the event data;
   identifying a geographic boundary for an area associated with the event data at least in part by encompassing the plurality of sensors and by processing at least one datum relating to at least one characteristic of the first event type, the area associated with the event data comprising areas affected by and likely to be affected by the first event type;
   automatically generating a response based upon the first event type and the geographic boundary, including by identifying a customer who resides on property within the geographic boundary; and
   providing operational instructions based upon the first event type to a customer sensor installed on the property of the customer.

2. The computer-implemented method of claim 1, wherein the response includes an indication that human personnel should be deployed to the area associated with the event data.

3. The computer-implemented method of claim 1, wherein the response includes a list of person(s) residing in the area associated with the event data.

4. The computer-implemented method of claim 1, wherein the response includes (i) determining a GPS location of a second customer based upon GPS location data; and (ii) determining that the GPS location of the second customer is within the geographic boundary for the area associated with the event.

5. The computer-implemented method of claim 4, wherein the response further includes generating an alternate route for a vehicle of the second customer and transmitting the alternate route to at least one of the vehicle and a mobile device of the user.

6. The computer-implemented method of claim 3, further comprising comparing a set of insurance claims with the list of person(s).

7. The computer-implemented method of claim 1, wherein at least some of the event data is weather-related data received from an external database configured for weather tracking.

8. The computer-implemented method of claim 1, wherein at least some of the event data is received from an external database configured for alarm system monitoring.

9. The computer-implemented method of claim 1, wherein the first event type is a weather-related event.

10. The computer-implemented method of claim 1, wherein the first event type is an electrical outage-related event.

11. The computer-implemented method of claim 1, wherein the first event type is a traffic-related event.

12. The computer-implemented method of claim 1, wherein at least some of the plurality of sensors generate physical weather-related data.

13. The computer-implemented method of claim 1, wherein at least some of the plurality of sensors generate traffic-related data.

14. The computer-implemented method of claim 1, wherein at least some of the plurality of sensors generate structural status information regarding the plurality of structures.

15. The computer-implemented method of claim 1, further comprising the step of confirming the occurrence of the first event type by comparison of the event data with a supplemental data set, the supplemental data set including weather-related data received from an external database configured for weather tracking.

16. A non-transitory computer-readable medium with an executable program stored thereon for detecting and generating an automated response to a catastrophic event, wherein the program instructs a processing element of a computing device to perform the following:
   analyze event data generated by a plurality of sensors positioned in and around a plurality of houses to determine that event threshold for a first event type has been met or exceeded by the event data;
   identify a geographic boundary for an area associated with the event data at least in party by encompassing the plurality of sensors and by processing at least one datum relating to at least one characteristic of the first event type, the area associated with the event data comprising areas affected by and likely to be affected by the first event type;
   automatically generate a response based upon the first event type and the geographic boundary, including by identifying a customer who resides on property within the geographic boundary; and
   provide operational instructions based upon the first event type to a customer sensor installed on the property of the customer.

17. A computing device for detecting and generating an automated response to a catastrophic event, the device comprising:
   a communication element configured to receive event data generated by a plurality of sensors positioned in and around a structure;
   a memory element electronically coupled to the communication element, the memory element configured to store data and executable instructions; and
   a processing element electronically coupled to the communication element and the memory element, the processing element configured to—
   analyze event data generated by the plurality of sensors to determine that an event threshold for a first event type has been met or exceeded by the event data;
   identify a geographic boundary for an area associated with the event data at least in part by encompassing the plurality of sensors and by processing at least one datum relating to at least one characteristic of the first event type, the area associated with the event data comprising areas affected by and likely to be affected by the first event type;
   automatically generate a response based upon the first event type and the geographic boundary, including by identifying a customer who resides on property within the geographic boundary; and
   provide operational instructions based upon the first event type to a customer sensor installed on the property of the customer.

18. The computing device of claim 17, wherein the first event type is a weather-related event.

19. The computing device of claim 17, wherein the first event type is an electrical outage-related event.

20. The computing device of claim 17, wherein the first event type is a traffic related event.

* * * * *